(12) United States Patent
Dolev et al.

(10) Patent No.: US 7,130,093 B2
(45) Date of Patent: Oct. 31, 2006

(54) OPTICAL IMPLEMENTATION OF BOUNDED NON-DETERMINISTIC TURING MACHINES

(76) Inventors: Shlomo Dolev, 7 Ziet Street, Omer 84965 (IL); Yuval Nir, 26 Oren Street, Karmey Yosef 99797 (IL)

( * ) Notice: Subject to any disclaimer, the term of this patent is extended or adjusted under 35 U.S.C. 154(b) by 96 days.

(21) Appl. No.: 10/847,774

(22) Filed: May 18, 2004

(65) Prior Publication Data

US 2005/0013531 A1 Jan. 20, 2005

(30) Foreign Application Priority Data

May 19, 2003 (IL) .................................... 155994

(51) Int. Cl.
*G06E 3/00* (2006.01)
*G06E 1/04* (2006.01)
*G02F 3/00* (2006.01)

(52) U.S. Cl. .................. 359/107; 359/108; 708/191
(58) Field of Classification Search ................ 359/107, 359/15, 108; 395/24; 340/146.3 P; 708/191; 385/17

See application file for complete search history.

(56) References Cited

U.S. PATENT DOCUMENTS

| 4,084,880 | A | * | 4/1978 | Clow | .............. | 359/15 |
| 5,075,573 | A | | 12/1991 | Huignard et al. | | |
| 5,247,593 | A | * | 9/1993 | Lin et al. | ............. | 385/17 |
| 5,282,067 | A | | 1/1994 | Liu | | |

OTHER PUBLICATIONS

J.H. Reif, J.D. Tygar, A. Yoshida, *Computability And Complexity Of Ray Tracing*, Discrete & Computational Geometry 11, 1994, pp. 265-287, Springer-Verlag New York Inc.

Arnd Krueger, *Laser Amplifiers Power Up*, SPIE'S OEMagazine, Oct. 2002, pp. 28-30.

Takahiko Nakatogawa, Atsushi Okamoto, Kunihiro Sato, *Multi-Channel Reading In Free Space For WDM Signals With Photorefractive Connection Module*, OptNet, Research Group Of Computer And Communication System, Graduate School Of Engineering, Hokkaido University, Sapporo, Japan, undated.

(Continued)

*Primary Examiner*—Audrey Y. Chang
(74) *Attorney, Agent, or Firm*—Alston & Bird LLP

(57) ABSTRACT

Method and an optical computation device for obtaining an indication about the existence of a feasible solution for a bounded instance of a problem that belongs to the non-deterministic polynomial class of problems, using parallel optical computations employing a multitude of light rays simultaneously propagating along paths in an optical arrangement. An optical arrangement that can implement a universal non deterministic Turing Machine that can solve bounded instances of problems of the class is determined. An initial incoming ray is directed to a point in the optical arrangement, that represents the initial configuration of the universal non deterministic Turing Machine, such that the initial configuration corresponds to the bounded instance. Each incoming ray is split within the optical arrangement into two or more outgoing rays at pre-determined locations in the optical arrangement. Each incoming ray and/or outgoing rays is amplified, such that each of the outgoing rays has at least the same power as the initial incoming ray. The position, measured in two or more dimensions, of the rays, on the components of the optical arrangement, is used to represent intermediate and/or final computation results, and whenever an outgoing ray is detected within a predetermined time at a position in the optical arrangement that represents a final state of the universal non deterministic Turing Machine, this position is converted to that indication.

6 Claims, 2 Drawing Sheets

OTHER PUBLICATIONS

Harry R. Lewis, Christos H. Papadimitriou, *Elements of the Theory of Computation*, Second Edition, Prentice-Hall Inc., 1998, pp. 179-185 and 275-297.

Thomas H. Cormen, Charles E. Leiserson, Ronald L. Rivest, *Introduction to Algorithms*, MIT Press, 1990, pp. 539-541.

John E. Hopcroft, Jeffrey D. Ullman, *Introduction to Automata Theory, Languages and Computation*, Addison-Wesley Publishing Company, 1979, pp. 285-287.

Douglas E. Comer, *Network Systems Design*, Using Network Processors, Intel IXP Version, Prentice Hall Inc., 2004, pp. 136-141.

* cited by examiner

OPTICAL IMPLEMENTATION OF BOUNDED NON-DETERMINISTIC TURING MACHINES

FIELD OF THE INVENTION

The present invention is related to the field of optical computing. More specifically it presents a method for constructing an optical computer that simulates a bounded input non-deterministic Turing Machine.

BACKGROUND OF THE INVENTION

Optical computing is viewed as a promising computational model. The classic deterministic Turing Machine model is the base for the computation complexity classes, since any (electronic) computer can be viewed as a version of a Turing Machine. The definition of the classical Turing Machine has been extended to the case of a non-deterministic Turing Machine [M. R. Garey and D. S. Johnson, *Computers and Intractability: A Guide to the Theory of NP-Completeness,* W. Freeman Company, 1990], where the choice of the next state is chosen arbitrarily; in fact, all possible choices should be examined in order to reject the input. The definition of non-deterministic Turing Machine classifies many very important classic problems, such as the traveling salesman problem, as problems that can be solved in polynomial time by the non-deterministic Turing Machine.

A model for implementing a deterministic Turing Machine based on optical ray tracing is presented in [J. H. Reif, D. Tygar, and A. Yoshida, *"Computability and Complexity of Ray Tracing"*, Discrete and Computational Geometry 11 (1994), pp. 265–297]. It would be very desirable to extend this model to the case of non-determinism and even more desirable to provide a device capable of carrying out this model.

It is an object of the present invention to provide a model of an optical computation device that can implement non-deterministic Turing Machines up to a bounded input length.

Further purposes and advantages of this invention will appear as the description proceeds.

SUMMARY OF THE INVENTION

In order to understand the structure of the device of the invention, a formal model of computation based on optical computing is first described. In this model non-determinism is achieved in a realizable way by the inherent parallel properties of optical computation. This model is based on optical ray tracing as presented in Reif, op. cit. By enhancing the model of Reif, non-determinism is simulated as a parallel computation of all non-deterministic choices, simultaneously. The simultaneous computation is achieved by power enhancement and splitting of the optical ray of computation into two separate optical (laser) rays, each representing a possible non-deterministic choice of the computation.

In Reif op. cit. it is shown that by using only refractive components (prisms) and using only rational representation coordinates one can build an optical machine that simulates a Turing Machine. By adding additional optical components that are partially refractive, an optical machine can be made to simulate non-deterministic Turing Machines as well. These partially refractive components are also capable of splitting an incoming ray into two separate outgoing rays, each, with the same energy as the incoming ray.

In a first aspect the present invention is directed towards providing a method of obtaining an indication about the existence of a feasible solution for a bounded instance of a problem that belongs to the non-deterministic polynomial class of problems. The method uses parallel optical computations employing a multitude of light rays simultaneously propagating along paths in an optical arrangement. The method of the invention comprises the following steps:

- determining an optical arrangement being capable of implementing a universal non deterministic Turing Machine that can solve bounded instances of problems of the given class;
- directing at least an initial incoming ray to a point in the optical arrangement that represents the initial configuration of the universal non deterministic Turing Machine. This initial configuration corresponds to the bounded instance of the problem for which an indication of the existence of a solution is sought;
- splitting each incoming ray within the optical arrangement into at least two outgoing rays at pre-determined locations in the optical arrangement;
- amplifying each incoming ray and/or outgoing rays, such that each of the outgoing rays has at least the same power as the initial incoming ray;
- using the position, measured in two or more dimensions, of the rays, on the components of the optical arrangement, to represent intermediate and/or final computation results; and
- whenever an outgoing ray is detected, within a predetermined time, at a position in the optical arrangement that represents a final state of the universal non deterministic Turing Machine, converting the position to the indication.

The method of the invention can be used to obtain the solution for a bounded instance of a problem by using the indication and by modifying the initial configuration. The process of obtaining the solution can be made more efficient by adjusting the construction of the optical arrangement to a specific problem by:

- masking incoming rays that propagate along optical paths that correspond to unfeasible computation processes, according to the specific problem, to be solved; and
- using programmable masks to block optical paths and/or increase the time of travel of a ray along an optical path according to the specific instance of the specific problem.

As a specific example, the method of the invention can be used to solve a traveling salesman path problem. For this problem the solution may be obtained by performing the following steps:

- providing an array comprising n sets of prisms, each of the n sets comprising n prisms, each of which have different lengths measured in slots, the length of each of the n prisms in each of the sets being respectively, $n^0$, $n^1$, $n^2$, ..., $n^{n-1}$ slots;
- masking, using a plurality of blocking masks, selected slots of the n prisms of each of the n sets for eliminating light rays from propagating along predetermined paths corresponding to unfeasible computation processes, associated with the general type of problem to be solved;
- masking, using a set of independently programmable masks, for eliminating or increasing the time of travel of light rays propagating along predetermined paths corresponding to unfeasible computation processes, associated with the specific instance of the specific problem to be solved;

providing an optical arrangement for each of the prisms of each of the n sets. Each of the optical arrangements having means for dividing a ray arriving at prism m of one of the sets into n−1 output rays, means for pre-amplifying the energy of each input ray such that each of the n−1 output rays has essentially the same energy as the input ray, and means for directing each of the output rays to prism in one of the remaining n−1 sets;

detecting a ray arriving at prism n of each of the set of n prisms, by using a concentrating lens and a detector at the output of prism n;

causing k (k=1, 2, . . . n) input rays, each of which corresponds to a different input ray, to reach k prisms, each being the first prism in a different one of the sets of n prisms; and obtaining all of the allowed solutions of the bounded input non-deterministic polynomial problem by detecting the slot in prism n of each set through which a ray is output by the optical arrangement.

In another aspect the present invention is directed towards providing an optical computer for obtaining an indication about the existence of a feasible solution for a bounded instance of a problem that belongs to the non-deterministic polynomial class of problems. The optical computer uses parallel optical computations employing a multitude of light rays simultaneously propagating along paths in an optical arrangement. The optical computer comprises:

reflective and/or refractive components for directing the light rays along the paths;

means for providing initial incoming light rays;

means for splitting incoming rays into at least two outgoing rays;

means for amplifying the energy of each incoming ray and/or outgoing rays, such that each of the outgoing rays has at least the same power as the initial incoming ray;

means for detecting outgoing rays, within a predetermined time, at a position in the optical arrangement that represents a final state of the universal non deterministic Turing Machine;

means for converting the position to the indication; and optionally means for masking incoming rays, according to the specific problem, to be solved; and programmable masks to block optical paths and/or increase the time of travel of a ray along an optical path according to the specific instance of the specific problem.

All the above and other characteristics and advantages of the invention will be further understood through the following illustrative and non-limitative description of preferred embodiments thereof, with reference to the appended drawings.

DETAILED DESCRIPTION OF PREFERRED EMBODIMENTS

Figure 1:
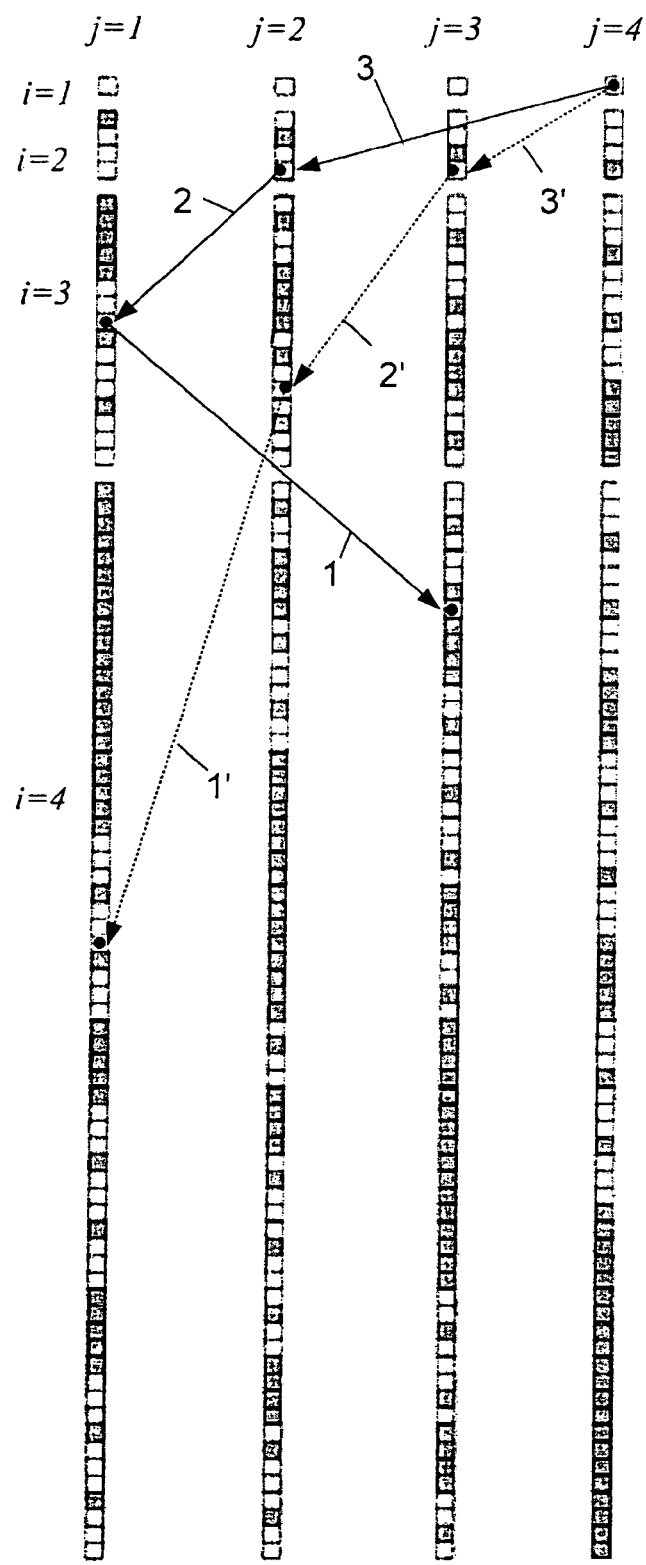
FIG. 1 shows schematically a simplified solution for the traveling salesman problem exploring all possible solutions in parallel.

In this specification, the following terms will have the listed meaning:

Turing Machine State—The Turing Machine control state that implements the transition function.

Tape Content—The values stored in the Turing Machine tape. The values are taken from a given set of possible symbols.

Cell—A location in the Turing Machine tape. A cell contains exactly one symbol.

Computation Step—A read of the tape location, a state change of the Turing Machine including a write to the tape location, and a left or right movement of the reading head.

Turing Machine Configuration—The Turing Machine state, the tape content, and the reading head location.

Complex box—A physical device that represent all Turing Machine configurations that have a particular Turing Machine state.

In Reif, et. al. it is shown that the states of a deterministic optical Turing Machine are a finite set of refractive objects that have an entrance (input window) and two exit windows. The ray of light enters perpendicular to the entrance window and its location in relation to the window represents the content of the tape. Inside a state, the ray of light is transformed in accordance with a deterministic transition function to the appropriate exit window and the ray location on the exit window represents the new configuration of the machine tape. The ray is then redirected to the appropriate next state to continue the computation.

In the present invention non-determinism is achieved by amplifying and splitting any outgoing ray from some state to all possible states as defined by the non-deterministic transition function.

It is assumed that a given non-deterministic Turing Machine has a single working tape and a limited non-deterministic choice fanout of 2. Under these assumptions, all state transitions of the non-deterministic machine are defined, at each step of the computation execution, as two possible state transitions. Each state transition will contain two possible non-deterministic choices, and the non-deterministic machine will choose the correct state transition to reach an acceptable configuration if such a choice exists. In the case of machines that can change states (non-deterministically) to a larger number of possible states, the states of the given machine can be transformed into the form described hereinabove, i.e. having at most two ray fan-out, with the use of only a log(|Q|) multiplication factor over the execution time, where Q is the set of machine states.

The present invention assumes a universal non-deterministic machine U that, upon receiving an encoding of any given two fan-out non-deterministic machine, can simulate that machine on any input. A universal non-deterministic Turing Machine U will simulate a non-deterministic machine N in much the same manner as a deterministic universal machine simulates a deterministic Turing Machine. The difference being that, upon reaching a state transition with two possible non-deterministic choices, U will make a non-deterministic choice to simulate the choice made by N and it then will proceed with the simulation as if N had made that choice.

In practice, the framework described is used to solve a specific problem in the Non-deterministic Polynomial class of problems, by designing an efficient representation for the problem (rather than using the Turing Machine representation). In order to demonstrate the invention, a way to solve the specific problem of the traveling salesman will now be described. The example is simplified, in order to demonstrate the core ideas and techniques that are the base for the present invention.

EXAMPLE

Traveling Salesman Path

FIG. 1 represents one example of a way of representing the configuration of an optical computer for solving a non-deterministic problem having four nodes. Each node comprises four prisms having different lengths. The length of each of the prisms is measured in ray spot area units that are called slots. The four prisms of each node $prism_1$, $prism_2$, $prism_3$ and $prism_4$, are, respectively, of lengths $1=4^0$, $4=4^1$, $16=4^2$, and $64=4^3$. The ith prism of node $1 \leq j \leq 4$ is denoted by the notation $prism_{j,i}$. In addition $prism_{k,i}$ is logically (i.e. not physically) partitioned into 4 portions of the same size as $prism_{k,\,i-1}$ Every slot in the prisms represents a specific combination (a path). Every slot in the ith prism represents a path of length i-1 where by path length is meant the number of nodes through which the ray passes. The slot in the first prism represents the initial node of the path. Before defining for any general slot precisely the way in which it defines a path, two examples are given that will assist in building an intuitional feel for the method.

Referring to FIG. 1, the ray 1 that arrives at the $8^{th}$ slot of the $4^{th}$ prism of node number 3, arrives from node 1. Its origin is known because it arrives in the first quarter of the $4^{th}$ prism of node 3. To be more precise, ray 1 represents the output ray from the $8^{th}$ slot of the $3^{rd}$ prism of node 1. The input ray that results in ray 1 is ray 2 which originated in the $4^{th}$ slot of the $2^{nd}$ prism of node 2. The ray that arrives at this $4^{th}$ slot is ray 3 which originates at the first prism of node 4, i.e. at the ray source of node 4. Thus, rays 1, 2, and 3 depict a traversal that starts in node 4 continues to node 2 then node 1 and at last arrives at node 3. Similarly the rays 1', 2', and 3' depict a traversal that also starts in node 4 (prism 1, slot 1) but then continues to nodes 3 (prism 2, slot 4), 2 (prism 3, slot 12), and 1 (prism 4, slot 28) in that order.

In general, the mth slot in $prism_{j,i}$ is mapped to a permutation as follows: if the last index in the permutation is j then there are an additional i-1 indices such that the (i-1)th index, $q_{i-1}$ fulfills the inequality $(q_{i-1}-1)4^{i-2} < m \leq q_{i-1}4^{i-2}$.

The (i-2)nd index is computed by using $m'=m-(q^{i-1}-1)$ $4^{i-2}$ instead of m and using $4^{i-3}$ instead of $4^{i-2}$ in the above inequality. The indices that follow are computed in an analogous manner.

Roughly speaking, the light rays that reach $prism_{ki}$ are reflected to n-1 prisms $prism_{l,i+1}$ where l represents every node index except k. Thus, in the particular design under consideration, each prism should amplify the ray by a factor of n-1=3.

In solving a given type of problem it is known that some of the paths are not possible and therefore should be eliminated from the calculation. In solving the traveling salesman problem, e.g., each node is to be visited only once; therefore paths that traverse the same node more than once are not allowed. In order to remove these steps from the calculations carried out by the optical computer, a series of masks (shown as the grey slots in FIG. 1) that block the light rays along the forbidden paths are constructed.

The mask pattern that is used to eliminate the paths corresponding to unfeasible computation processes will now be described for the first node of the 4-node model considered above. The mask that blocks the light rays for the four prisms of node 1 can be viewed as if it is made up of n separate masks. The first of these masks covers every forth slot in every prism of node 1 starting with the first slot of the second prism. The second mask covers the block made up of the four first slots in every sixteen slots starting in the first slot of the third prism. In general, the Ah mask of node i covers the ith $4^{i-1}$ successive slots in every $4^i$ slots starting counting with the first slot of the (l+1)st prism, i.e. the $(i-1)4^{i-1}$ slots that precede the first masking area. The masks for the other nodes are constructed in an analogous manner.

FIG. 1, therefore, gives a pictorial indication of how the traveling salesman problem for the specific case of travel between four cities can be solved using an optical computer. Rays of light entering the device and striking the first prism in each node are split into three rays each of which travels to the second prism of the other nodes where it is again divided into three and travels to the third prism of a different node. The incoming rays at the fourth prism do not have to be further divided since only one output ray is allowed from these prisms. The output rays from each of the fourth prisms are focused by appropriate optics on a detector. If the detector detects the presence of an output ray, then it is known that a solution exists to the problem. The intensity of the detected output is directly related to the number of solutions. To determine the exact paths that are allowed, either a binary search technique can be employed or/and several detectors can be used.

The model of FIG. 1 is for the general case and all possible results are allowed. Furthermore, in FIG. 1 it is assumed that all of the distances are equal and therefore none of the possible paths is found to be preferred. In a trying to solve a specific instance of a specific problem, physical characteristics of the specific routes may be taken into account. For example, in a particular instance, no road may exist between two of the towns the salesman is to visit. In this case the possibility of direct travel between these two particular nodes must be removed from the calculation. Other types of physical factors that must be taken into account are factors that affect the travel time such as distance and difficulty, for example a steep incline between two of the towns. To take into account the physical differences between different instances of a problem, the optical computer must comprise, in addition to the fixed masks described hereinabove, programmable masks whose properties can change for each particular instance. The programmable masks must have the property that they can increase the time of travel of the ray along a particular path, either for a finite amount of time, to correspond to different distances or difficulty of travel, or indefinitely, to correspond to non-existent paths.

Nondeterministic Turing Machine

The optical components needed to construct the prisms of the non-deterministic optical computer will now be described. As described in Reif op. cit., the optical Turing Machine is comprised of a number of complex boxes, each corresponding to a different one of the possible finite states of the deterministic Turing Machine. Each complex box is made up of a combination of basic boxes. There are a finite number of basic boxes, each containing optical elements that either diffract or reflect the light ray in order to implement one step of the transition function defined for that state. Each basic box comprises a unit square entrance window, through which the light ray enters the box and one or two unit square exit windows. The light ray enters and exits the box perpendicular to the surface of the windows. The light ray enters a given complex box, passes through the proscribed arrangement of basic boxes that shift it, according to the transition function of that box, and exits out of one of the two exit windows. The choice of which exit window taken by the ray is determined by the state the Turing Machine can enter next. The ray then travels to the next complex box and in this way the ray travels through the system simulating the progress of the Turing engine from state to state.

The optical elements that are used to construct the basic boxes are prisms and plane mirrors although parabolic mirrors and hyperbolic lenses can also be used. Following the discussion in Reif op. cit., where the optics of the basic boxes is described, additional optical devices are required in the present invention. These additional devices must have at least one of the following properties:

(a) a device that splits the outgoing ray from some exit window into two outgoing rays while maintaining the relative location of these rays to two possible exit locations; and (b) a device that amplifies the energy of the split rays back to the original minimal energy of the original ray before splitting.

In practice, the device can be a one shot energy device where at each location a given ray has to be split into two rays, with at least the same energy as the original ray, only once. This is because the computations that are represented by a particular configuration have already been explored following the arrival of the first ray to this location.

The machine will accept an input if a ray arrives at the accepting state and will reject an input if a predefined time limit (polynomial in the input) elapses without reaching the accepting state or if no ray exists, due to loops in the same set of configurations.

Figure 2:
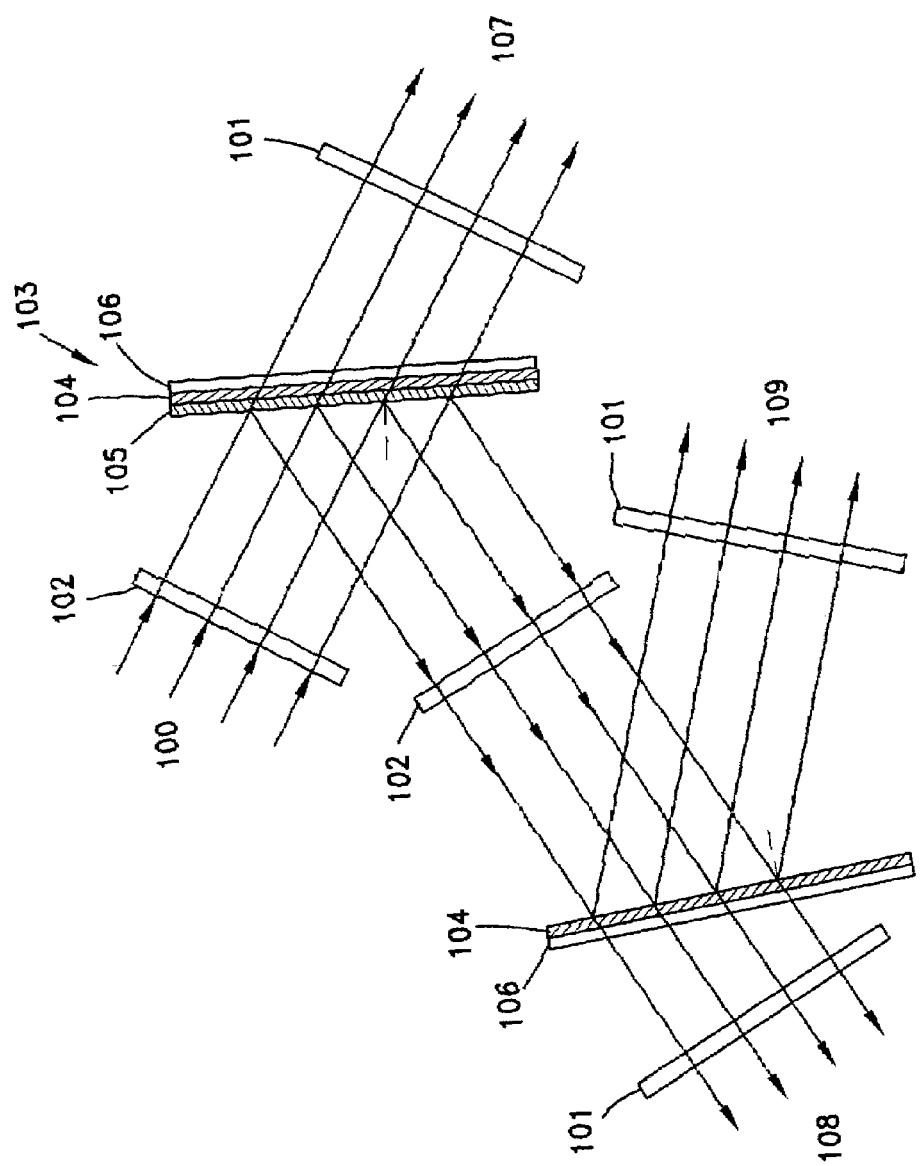
FIG. 2 schematically shows an optical arrangement representing the necessary elements for one of the nodes in the optical computer of the invention.

FIG. 2 schematically shows an arrangement that fits the particular problem of the traveling salesman path problem. The arrangement shown in FIG. 2 in fact contains the necessary design elements for a node of the optical computer. Numeral 100 represents the incoming ray of light arriving at one of the nodes 103 (e.g. node j of FIG. 1). Numerals 107, 108, and 109 indicate the three outgoing rays generated at each encounter of an incoming ray with a node. Numeral 101 represents a programmable mask for excluding from the calculation or delaying rays that are unfeasible according to the specific instance of the specific problem. A beam splitter layer 104 (50% reflecting—50% transmitting) is deposited on the front surface of substrate 106. Substrate 106 is depicted as a flat plate but a prism could also be used. Numeral 105 is a fixed mask that is deposited on the substrate for excluding from the calculation unfeasible paths, according to the particular problem. Numeral 102 designates an amplifier, suitable for increasing the energy of the ray that enters it by a factor a little more than two in order to assure that rays 107, 108, and 109 have the same energy as incoming ray 100. It is to be noted that in this example the incoming ray is amplified but the same result can be achieved using one amplifier on each output ray without amplifying the input ray or by amplifying both the input ray and the output rays. Not shown in FIG. 2 are plane mirrors that may be necessary near programmable masks 101 in order to steer the outgoing rays to the correct slot on the next node of the computer.

The energy requirements of the computer are supplied by the amplifiers 102 which, by doubling the energy of the ray before it is split, insure that the original energy of the ray is maintained as it passes through the possible paths and therefore the computation can be completed. Amplifiers 102 can be chosen from many types of devices known in the field of laser amplifier. These devices come in many forms as different as, for example, amplification devices disclosed in: Krueger, Arnd, Laser Amplifiers Power Up, spie's oemagazine, October 2002, pgs. 28–30. Amplification can be achieved by several techniques including implementing the amplification methods used with fiber optic systems such as erbium-doped fiber amplifiers, YAG laser amplifiers, dye laser amplifiers, etc.

Amplifier 102 may also be implemented by using a photorefractive crystal (a crystal or polymer that has an index of refraction which depends on the applied electric field). The use of photorefractive crystals for optical amplification is disclosed, for example, in U.S. Pat. No. 5,282,067, in U.S. Pat. No. 5,075,573, and in "Multi-Channel Reading In Free Space For WDM Signals With Photorefractive Connection Module Multi-Channel Reading In Free Space For WDM Signals With Photorefractive Connection Module", Takahiko et al., Research Group of Computer and Communication System, Graduate school of Engineering, Hokkaido University, Sapporo, Japan.

In this manner simultaneous computation of all possible non-deterministic computations can be carried out. It is to be noted that the growth in polynomial time achieved by the optical non-deterministic computer (i.e. number of steps carried out by the Turing Machine) is accompanied by an exponential growth in the amount of space and energy required. This follows from the fact that it must be ensured that every possible configuration of the Turing Machine can be represented and that from every configuration the ray can be split while at the same time amplifying the energy of both of the output rays to the original energy of the arriving ray.

The space restriction is not a new restriction since the optical deterministic computer presented in Reif, op. cit. has the same limitation (it has to represent every possible configuration), and still is of practical interest for large enough inputs. Concerning the area requirements of each beam splitter, a 1 meter by 1 meter square may represent at least $10^6 \times 10^6$ configurations. To minimize the space problem, it is preferable to replace the general description of the non deterministic Turing Machine, with specific NP-complete solvers, such as 3-sat or TSP solver [Garey and Johnson, op. cit.]. If this is done, then the $10^{12}$ configurations may be used in a more efficient way.

Although embodiments of the invention have been described by way of illustration, it will be understood that the invention may be carried out with many variations, modifications, and adaptations, such as using three (or more) dimensions of the hitting point of the arriving ray to determine the content of the Turing Machine tape and the location of the reading head (the frequency and the polarity of the arriving rays can serve as additional dimensions), without departing from its spirit or exceeding the scope of the claims.

The invention claimed is:

1. A method of obtaining an indication about the existence of a feasible solution for a bounded instance of a problem that belongs to the non-deterministic polynomial class of problems, using parallel optical computations employing a multitude of light rays simultaneously propagating along paths in an optical arrangement, said method comprising:

determining an optical arrangement comprising optical components, said optical components and arrangement designed to implement a universal non deterministic Turing machine to provide solutions for bounded instances of problems of said class;

directing at least an initial incoming ray to a point in said optical arrangement that represents the initial configuration of said universal non deterministic Turing machine, said initial configuration corresponds to said bounded instance;

splitting each incoming ray within said optical arrangement into at least two outgoing rays at pre-determined locations in said optical arrangement;

amplifying each incoming ray and outgoing rays, such that each of said outgoing rays has at least the same power as said initial incoming ray;

using the position, measured in two or more dimensions, of said rays, on the components of said optical arrangement, to represent intermediate and final computation results; and whenever an outgoing ray is detected, within a predetermined time, at a position in said optical arrangement that represents a final state of said universal non deterministic Turing machine, converting said position to said indication.

2. A method according to claim 1, further comprising obtaining the solution for the bounded instance of the problem by using the indication and by modifying the initial configuration.

3. A method according to claim 1, further comprising obtaining the solution by adjusting the construction of the optical arrangement to a specific problem by:

masking incoming rays that propagate along optical paths that correspond to unfeasible computation processes, according to said specific problem, to be solved; and using programmable masks to block optical paths or to increase the time of travel of a ray along an optical path according to the specific instance of said specific problem.

4. A method according to claim 3, wherein the problem is a traveling salesman path problem, the solution being obtained by performing the following steps:

a. determining the optical arrangement by:

providing an array comprising n sets of prisms, each of said n sets comprising n prisms, each of which have different lengths measured in slots, the length of each of said n prisms in each of said n sets being respectively, $n^0, n^1, n^2, \ldots, n^{-1}$, slots;

masking, using a plurality of blocking masks, selected slots of said n prisms of each of said n sets for eliminating light rays from propagating along predetermined paths corresponding to unfeasible computation processes, associated with said problem to be solved;

masking, using a set of independently programmable masks, for eliminating or increasing the time of travel of light rays propagating along predetermined paths corresponding to unfeasible computation processes, associated with the problem to be solved;

providing an optical arrangement for each of the first n−1 prisms of each of said n sets, each of said optical arrangements having means for dividing a ray arriving at prism m of one of said sets into n−1 output rays, while pre-amplifying the energy of each input ray such that each of said n−1 output rays has essentially the same energy as said input ray, and directing each of said output rays to prism in one of the remaining n−1 sets;

b. directing at least an initial incoming ray to a point in said optical arrangement, wherein each ray is split and then amplified by components of said optical arrangement;

c. further calculating by:

detecting a ray arriving at prism n of each of said set of n prisms, by locating a detector at the output of prism n;

causing k (k =1, 2, . . . n) input rays, each of which corresponds to a different input ray, to reach k prisms, each being the first prism in a different one of the sets of n prisms; and obtaining all of the allowed solutions of said bounded input non-deterministic polynomial problem by detecting the slot in prism n of each set through which a ray is output by said optical arrangement.

5. An optical computer for obtaining an indication about the existence of a feasible solution for a bounded instance of a problem that belongs to the non-deterministic polynomial class of problems, using parallel optical computations employing a multitude of light rays simultaneously propagating along paths in an optical arrangement said optical computer comprising:

reflective and refractive components for directing said light rays along said paths;

means for providing initial incoming light rays;

means for splitting incoming rays into at least two outgoing rays;

means for amplifying the energy of each incoming ray and outgoing rays, such that each of said outgoing rays has at leans the same power as said initial incoming rays;

means for detecting outgoing rays, within a predetermined time, at a position in said optical arrangement;

manes for converting said position to said indication.

6. An optical computer according to claim 5 comprising one or both of the following:

means for masking incoming rays, according to the specific problem, to be solved; and programmable masks to block optical paths or increase the time of travel of a ray along an optical path according to the specific instance of said specific problem.

* * * * *

UNITED STATES PATENT AND TRADEMARK OFFICE
CERTIFICATE OF CORRECTION

PATENT NO. : 7,130,093 B2
APPLICATION NO. : 10/847774
DATED : October 31, 2006
INVENTOR(S) : Dolev et al.

Page 1 of 1

It is certified that error appears in the above-identified patent and that said Letters Patent is hereby corrected as shown below:

Column 6,

Line 10, "Ah" should read --$l$th--;

Line 11, "$4^{l-1}$" should read --$4^{l-1}$--.

Column 10,

Line 40, "leans" should read --least--;

Line 43, "manes" should read --means--.

Signed and Sealed this

Twentieth Day of March, 2007

JON W. DUDAS
*Director of the United States Patent and Trademark Office*